United States Patent
Lee et al.

(10) Patent No.: US 9,838,257 B2
(45) Date of Patent: Dec. 5, 2017

(54) NETWORK APPARATUS FOR TEMPORARILY ACCESSING NETWORK SETTING AND METHOD USING THEREOF

(71) Applicant: AccelStor, Inc., New Taipei (TW)

(72) Inventors: Yu-Ching Lee, New Taipei (TW); Hann-Huei Chiou, New Taipei (TW)

(73) Assignee: ACCELSTOR, INC., New Taipei (TW)

( * ) Notice: Subject to any disclaimer, the term of this patent is extended or adjusted under 35 U.S.C. 154(b) by 191 days.

(21) Appl. No.: 15/046,545

(22) Filed: Feb. 18, 2016

(65) Prior Publication Data

US 2017/0134225 A1     May 11, 2017

(30) Foreign Application Priority Data

Nov. 5, 2015     (TW) .............................. 104136562 A

(51) Int. Cl.
*G06F 15/177*     (2006.01)
*H04L 12/24*     (2006.01)

(52) U.S. Cl.
CPC ...... *H04L 41/0816* (2013.01); *H04L 41/0803* (2013.01); *H04L 41/28* (2013.01)

(58) Field of Classification Search
CPC .. H04L 41/0803; H04L 41/0816; H04L 41/28
USPC ................................................ 709/220, 221
See application file for complete search history.

(56) References Cited

U.S. PATENT DOCUMENTS

| | | | | |
|---|---|---|---|---|
| 6,654,382 B1* | 11/2003 | Bare | ...................... | H04L 29/06 370/392 |
| 2003/0069947 A1* | 4/2003 | Lipinski | .................. | H04L 29/06 709/220 |
| 2004/0249907 A1* | 12/2004 | Brubacher | .......... | H04L 41/0816 709/220 |
| 2006/0198356 A1* | 9/2006 | Mayernick | .......... | H04L 12/2898 370/351 |
| 2008/0186875 A1* | 8/2008 | Kitani | ................. | H04L 41/0816 370/254 |
| 2015/0341219 A1* | 11/2015 | Hong | .................... | G06F 9/4401 709/224 |

* cited by examiner

*Primary Examiner* — Liangche A Wang
*Assistant Examiner* — Johnny Aguiar
(74) *Attorney, Agent, or Firm* — McClure, Qualey & Rodack, LLP

(57) ABSTRACT

A network apparatus for temporarily accessing network setting and a method using the device are provided. In the method, when a mode switch condition is satisfied, the network apparatus is switched from an operation mode to a temporal management mode, so that a user can allow a device to connect to the network apparatus by a preset network address. Furthermore, the network apparatus may be logged in by a temporal account password, so that the user can set the network apparatus or search the original management network address of the network apparatus. When the mode switch condition is off, the network apparatus is switched back to the operation mode so as to perform its original functions without resetting the network apparatus.

11 Claims, 3 Drawing Sheets

NETWORK APPARATUS FOR TEMPORARILY ACCESSING NETWORK SETTING AND METHOD USING THEREOF

CROSS-REFERENCES TO RELATED APPLICATIONS

This non-provisional application claims priority under 35 U.S.C. §119(a) on Patent Application No. 104136562 filed in Taiwan, R.O.C. on 2015 Nov. 5, the entire contents of which are hereby incorporated by reference.

BACKGROUND

Technical Field

The instant disclosure relates to a network apparatus, and particularly relates to a network apparatus for temporarily accessing network setting and method using thereof.

Related Art

With the blooming developments in network technology, network apparatuses are among nowadays peoples' life. Commonly, a setting device (e.g., a computer) can be connected to an existing network apparatus through a network connecting port of the network apparatus. Accordingly, a user can operate the setting device to set the network apparatus. However, since the user would not set the network apparatus frequently, the user usually forgets the network address of the network apparatus when the user tends to build a connection between a device and the network apparatus. Consequently, the device is failed to connect to the network apparatus.

To solve the problem, an approach of the apparatus manufacturers is to configure a reset button on the existing network apparatus. When the user presses the reset button, the setting of the network apparatus is back to a default state, so that the user can login and set the network apparatus with the default network address and the default management account password. However, although the reset function of the network apparatus solves the problem, another problem goes out. In other words, because the former preferences of the setting of the network apparatus set by the user are vanished due to the reset, the user has to set these parameters again.

SUMMARY

In view of these, a first embodiment of the instant disclosure provides a network apparatus for temporarily accessing network setting. The network apparatus comprises a storage unit, at least one first network connecting port, a first network management unit, a second network management unit, a second network connecting port, and a processing unit. The first network management unit is electrically connected to the storage unit and the first network connecting port. The second network management unit is electrically connected to the storage unit and the second network connecting port.

The storage unit stores a management network address and a preset network address. The first network connecting port is adapted to connect to a net surfing device. The first network management unit stores a first network setting. The first network setting corresponds to the first network connecting port and comprises the management network address, so that the first network management unit communicates with a setting device in an operation mode. The second network connecting port is idle normally. In the operation mode, the processing unit detects if a mode switch condition is satisfied. The mode switch condition is satisfied when the setting device is connected to the second network connecting port. When the mode switch condition is satisfied, the network apparatus is switched from the operation mode to a temporal management mode. The processing unit controls the second network management unit to store a second network setting in the temporal management mode. The second network setting comprises the preset network address and corresponds to the second network connecting port, so that the second network management unit communicates with the setting device. The processing unit executes a feedback action based on a control command sent by the setting device and detects if the mode switch condition is off. The processing unit switches the temporal management mode back to the operation mode when the mode switch condition is off.

A first embodiment of the instant disclosure further provides a method for temporarily accessing network setting of a network apparatus. The network apparatus comprises at least one first network connecting port and a second network connecting port. The method comprises storing a first network setting which comprises a management network address and corresponds to the first network connecting port so as to communicate with a setting device through the first network connecting port; detecting if a mode switch condition is satisfied, if yes, switching to a temporal management mode, wherein the mode switch condition is satisfied when the second network connecting port is connected to the setting device; storing a second network setting which comprises a preset network address and corresponds to the second network connecting port in the temporal management mode so as to communicate with the setting device through the second network connecting port; executing a feedback action based on a control command sent by the setting device; and switching back to an operation mode when the mode switch condition is off, wherein the first network connecting port is adapted to connect to an external net surfing device in the operation mode.

A second embodiment of the instant disclosure also provides a network apparatus for temporarily accessing network setting. The network apparatus comprises a storage unit, at least one first network connecting port, a first network management unit, a trigger unit, and a processing unit. The first network management unit is electrically connected to the storage unit and the first network connecting port.

The storage unit stores a management network address and a preset network address. The first network connecting port is adapted to connect to a net surfing device. The first network management unit stores a first network setting. The first network setting corresponds to the first network connecting port and comprises the management network address, so that the first network management unit communicates with a setting device in an operation mode. The trigger unit generates a trigger signal based on a trigger condition. The processing unit detects if the trigger signal is generated and if a mode switch condition is satisfied. If yes, the operation mode is switched to a temporal management mode. The mode switch condition is satisfied when the first network connecting port is connected to the setting device. In the temporal management mode, the processing unit resets the management network address of the first network setting stored in the first network management unit and sets the first network setting to comprise the preset network address, so that the processing unit communicates with the setting device. The processing unit executes a feedback action based on a control command sent by the setting device and detects if the mode switch condition is off. When the mode switch condition is off, the processing unit switches the temporal management mode back to the operation mode.

Based on the above, according to a network apparatus and a method for temporarily accessing network setting of a network apparatus of embodiments of the instant disclosure, when the user forgets the management network address, the user can allow the network apparatus to be switched to the temporal management mode so as to get the management network address again or to change the management network address. In some embodiments, when the user forgets the administrator account password, the user can login the network apparatus by a temporal account password in the temporal management mode. Accordingly, by the switching between the temporal management mode and the operation mode, the network apparatus is not necessary to be reset to a default state, and the setting in the network apparatus can be prevented from being reset.

BRIEF DESCRIPTION OF THE DRAWINGS

The disclosure will become more fully understood from the detailed description given herein accompanying by the following figures, which are illustration only, and thus not limitative of the disclosure, wherein.

DETAILED DESCRIPTION

It should be realized that, the phrase "one embodiment" mentioned hereinafter means that the combination of the described features, structures, or the properties of this embodiment can be included in at least one of the implementations of the disclosure. Wherein, the phrase "In one embodiment" may be related to many different embodiments which are compatible with each other.

Also, it should be realized that, when one member is "connected to" another member hereinafter, the member can be directly connected to another member, or an intermediate member can be connected between the member and another member. On the contrary, when the member is "directly connected to" another member, no intermediate member is connected between the member and another member.

It is understood that, the terminologies used hereinafter are provided for explaining the embodiments in a clear manner rather than for limiting the invention itself. For example, members with the same numerical number represent the same member. In addition, although adjectives such as "first" and "second" are provided for describing different members, the order of the members is not limited thereto. Hereinafter, the phrase "and/or" includes any of, many of, or all of the combinations of the listed terms. It should be realized that, the singular term "a/an" and "the" can also includes the plural condition, unless in the condition where the number of the member are clearly defined in the specification.

It should also be realized that, when the phrases "comprise(s)" and/or "include(s)" are applied for describing a feature, a step, a member and/or a component, further features(s), step(s), member(s), component(s) and/or the combination thereof are not excluded from the disclosure.

The phrase "electrically connected" mentioned hereinafter refers to two devices or members are connected with each other by means of electrical coupling or electrical conduction, so that electrical signals can be sent between the two devices or members.

Figure 1:
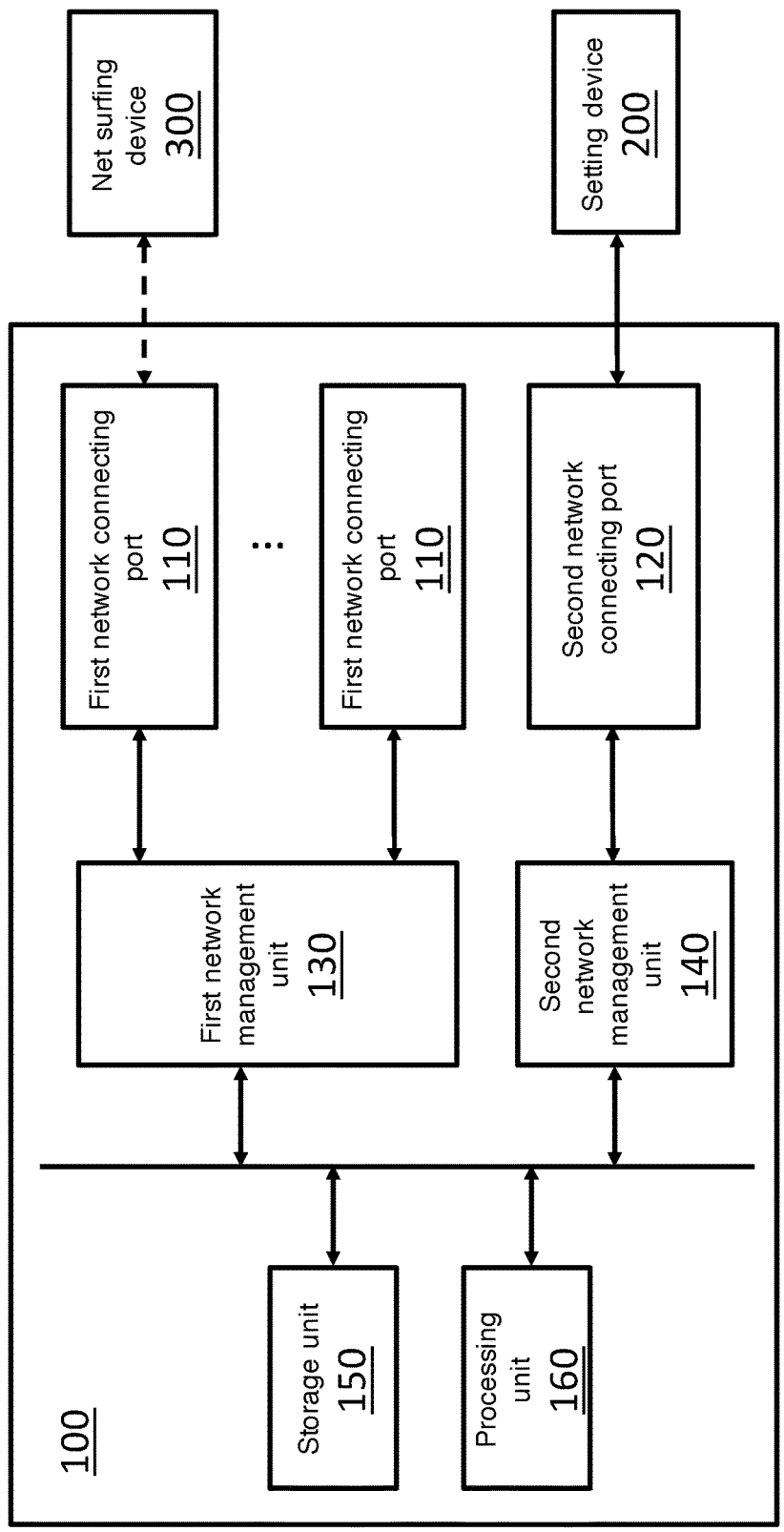
FIG. 1 illustrates a schematic view of a network apparatus for temporarily accessing network setting of a first embodiment of the instant disclosure.
Figure 2:
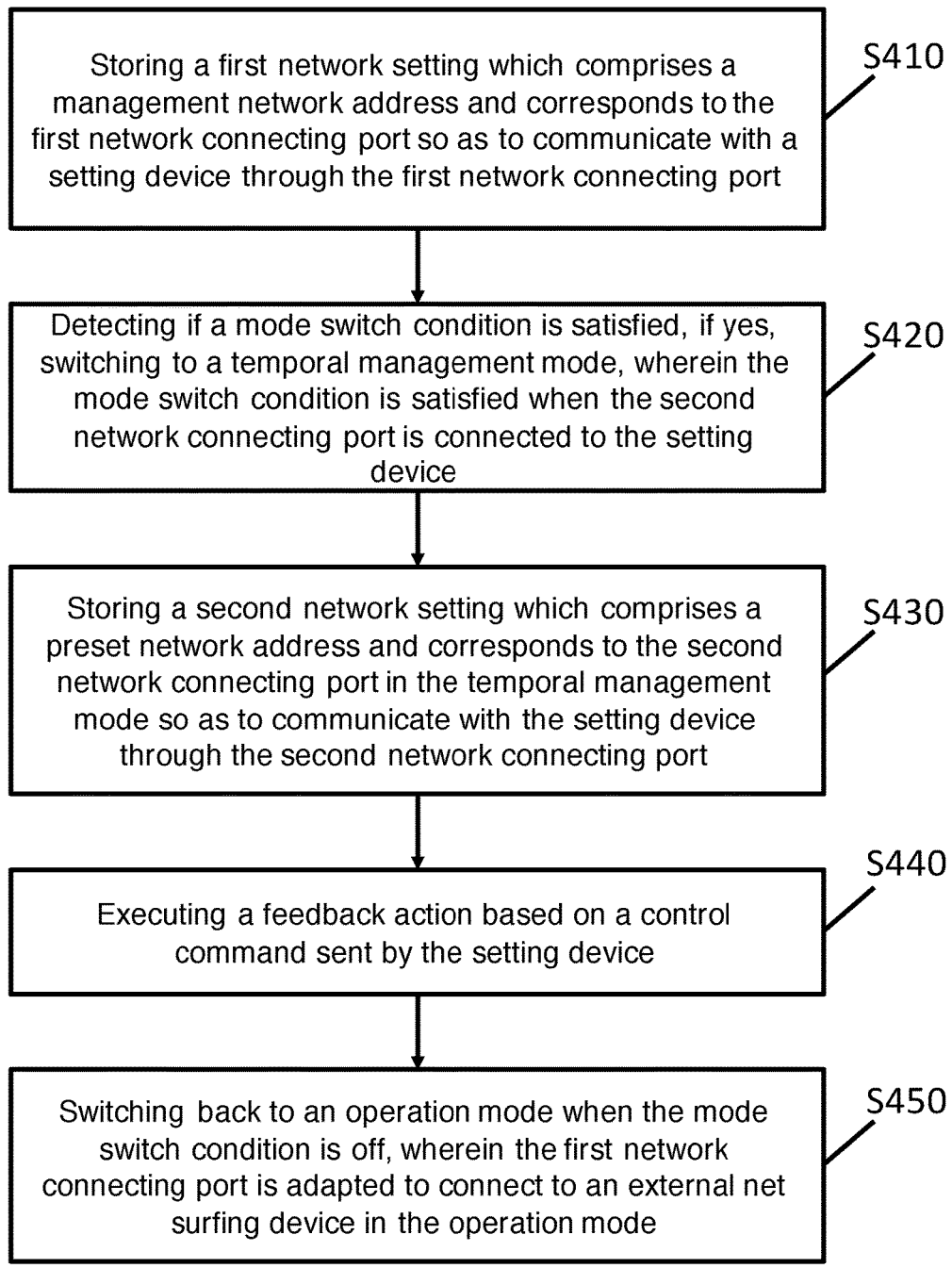
FIG. 2 illustrates a flowchart of a method for temporarily accessing network setting of the network apparatus according to the first embodiment of the instant disclosure.

Please refer to FIG. 1 and FIG. 2. FIG. 1 illustrates a schematic view of a network apparatus for temporarily accessing network setting 100 of a first embodiment of the instant disclosure. FIG. 2 illustrates a flowchart of a method for temporarily accessing network setting of the network apparatus 100 according to the first embodiment of the instant disclosure. The network apparatus for temporarily accessing network setting 100 (hereinafter, simply called the network apparatus 100) comprises at least one first network connecting port 110, a second network connecting port 120, a first network management unit 130, a second network management unit 140, a storage unit 150, and a processing unit 160. Hereinafter, although several first network connecting ports 110 are illustrated in the exemplary embodiment, in some embodiments, the network apparatus 100 comprises one first network connecting port 110. The first network management unit 130 is electrically connected to the storage unit 150 and the first network connecting port 110. The second network management unit 140 is electrically connected to the storage unit 150 and the second network connecting port 140. The processing unit 160 is electrically connected to the storage unit 150, the first network connecting port 110, the second network connecting port 120, the first network management unit 130, and the second network management unit 140. The processing unit 160 is a unit capable of performing calculation and executing software programs.

The first network connecting port 110 and the second network connecting port 120 are connecting holes applicable for Ethernet interfaces, so that the first network connecting port 110 (or the second network connecting port 120) may be connected to a network wire having a RJ45 plug, for example. In an operation mode of the network apparatus 100, the first network connecting port 110 of the network apparatus is adapted to be connected with an external net surfing device 300 for executing its original functions. In this embodiment, the network apparatus 100 may be a hub, a switch, an IP sharing box, a router, a wireless access point (WAP), etc. The net surfing device 300 is a device capable of connecting to internet or local area network (LAN). For example, the net surfing device 300 may be a desktop computer, a laptop computer, a workstation, a server, etc.

The first network management unit 130 and the second network management unit 140 are management units applicable for network transmission protocol and respectively have storage spaces (e.g., random access memories (RAMs)). The storage space of the first network management unit 130 can store a network setting (hereinafter, called a first network setting) corresponding to the first network connecting port 110, so that based on the first network setting, the first network connecting port 110 communicates with a device which is connected to the first network connecting port 110. Similarly, the storage space of the second network management unit 140 can store a network setting (hereinafter, called a second network setting) corresponding to the second network connecting port 120, so that based on the second network setting, the second network connecting port 120 communicates with a device which is connected to the second network connecting port 120.

The storage unit 150 is a non-volatile memory. For example, the storage unit 150 may be a flash memory, an electrically erasable programmable read-only memory (EEPROM), and/or a read-only memory (ROM), etc. The storage unit 150 stores a management network address and a preset network address. In this embodiment, the management network address and the preset network address may be static addresses or dynamic addresses. The management network address is stored in a memory whose data can be erased and modified, for example, the memory can be a flash memory, an EEPROM, etc. Conversely, the preset network address is stored in read-only memory whose data cannot be erased or changed to prevent the data of the preset network address from being modified; however, the preset network address can still be stored in a data erasable and modifiable memory. The preset network address is stored in the storage unit 150 as the network apparatus 100 is manufactured. The preset network address may be, for example, 192.168.1.1. The management network address may be preset as the network apparatus 100 is manufactured or the management network address may be set by the user.

In the operation mode, the first network management unit 130 stores the first network setting. The first network setting comprises the management network address. Accordingly, when a setting device 200 is connected to the first network connecting port 110, the setting device 200 can communicate with the network apparatus 100 by using the management network address as the target address (as shown in the step S410 of FIG. 2). Therefore, when a user tends to set the network apparatus 100 (e.g., change the management network address, modify the administrator account password, etc.), the user can use the setting device 200 to connect to the network apparatus 100 through the first network connecting port 110. However, once the user forgets the management network address, the user cannot set the network apparatus 100 by the foregoing means, but the user can still set the network apparatus 100 by other means described in the following paragraphs. In this embodiment, the setting device 200 is a device having network connection ability, for example, the setting device 200 can be a desktop computer, a laptop computer, a workstation, a server, etc.

Also, in the operation mode, the second network management unit 140 stores the second network setting in advance. The second network connecting port 120 is idle normally, and the second network connecting port 120 does not provide the network communication function in the operation mode. In the operation mode, the processing unit 160 detects if a mode switch condition is satisfied. In this embodiment, the mode switch condition is satisfied when the setting device 200 is connected to the second network connecting port 120. When the mode switch condition is satisfied, the network apparatus 100 is switched from the operation mode to the temporal management mode (as shown in the step S420 of FIG. 2). Therefore, when the mode switch condition is satisfied, i.e., after the user connects the setting device 200 to the second network connecting port 120, the processing unit 160 detects the mode switch condition is satisfied, and the network apparatus 100 is switched to the temporal management mode.

In the temporal management mode, the processing unit 160 controls the second network management unit 140 to store the second network setting corresponding to the second network connecting port 120. In other words, the processing unit 160 reads the preset network address stored in the storage unit 150 and writes the preset network address in the second network setting (i.e., the second network setting comprises the preset network address). Therefore, the setting device 200 can communicate with the network apparatus 100 by using the preset network address as the target address (as shown in the step S430 of FIG. 2).

Therefore, the user can operate the setting device 200 to send a control command to the network apparatus 100. Hence, the processing unit 160 executes a feedback action based on the control command sent by the setting device 200 (as shown in the step S440 of FIG. 2).

For example, the user operates the webpage browser of the setting device 200 and inputs the preset network address in the webpage browser, so that the setting device 200 is connected to the network apparatus 100. Through an administrator authentication procedure (e.g., verifying the administrator account password), the setting device 200 can send the control command to the network apparatus 100 through a web console, a web UI, or other means. In one embodiment, the feedback action is sending back a data package comprising the management network address or changing the management network address of the first network setting based on the control command. In other words, when the user forgets the management network address, the user can operate the setting device 200 to send a control command for searching the management network address, so that the processing unit 160 sends back a data package comprising the management network address. Therefore, after the setting device 200 receives the data package, the management network address is displayed on the setting device 200, and the user can know the management network address. Accordingly, the user can use the management network address to connect to the network apparatus 100. Alternatively, the user can operate the setting device 200 to send a control command for changing the management network address and send a new management network address to the network apparatus 100, so that the processing unit 160 can replace the original management network address with the new management network address sent by the setting device 200. Accordingly, the user can use the new management network address to connect to the network apparatus 100. It is understood that, the feedback action is not limited thereto; the feedback action may be other actions capable of being executed with the administrator authentication, for example, performing other network setting, performing account password setting, etc.

Please refer to the step S450 shown in FIG. 2. In the temporal management mode, the processing unit 160 further detects if the mode switch condition is off. Therefore, when the mode switch condition is off (in this embodiment, the mode switch condition is off when the setting device 200 is disconnected with the second network connecting port 120, e.g., the net wire connected between the setting device 200 and the second network connecting port 120 is removed), the network apparatus 100 is switched back from the temporal management mode to the operation mode. Accordingly, even when the user forgets the management network address, the user does not have to reset the network apparatus 100 to a default state, and the settings in the network apparatus 100 can be prevented from being reset. After the network apparatus 100 is switched back to the operation mode, the first network connecting port 110 can be provided for connecting to the net surfing device 300 and executing its original functions.

In one embodiment, the mode switch condition is satisfied when the first network connecting port 110 is disconnected with the net surfing device 300 (i.e., the first network connecting port 110 is idle and does not connect to the net surfing device 300) and when the second network connecting port 120 is connected to the setting device 200. Accordingly, the network apparatus 100 is switched to the temporal management mode when the second network connecting port 120 is connected to the setting device 200 and when the first network connecting port 110 is disconnected with the net surfing device 300. Hence, when the user unintentionally connects the setting device 200 with the second network connecting port 120, the network apparatus 100 does not switch to the temporal management mode, and the network apparatus 100 can operate normally to perform its original functions.

In one embodiment, in the temporal management mode, the processing unit 160 resets the first network setting of the first network management unit 130 to prevent the network address confliction (e.g., when the management network address is the same as the preset network address). After the network apparatus 100 is switched back to the operation mode, the processing unit 160 sets the first network setting of the first network management unit 130 again based on the management network address stored in the storage unit 150 (i.e., the processing unit 160 recovers the setting to a version which is already presented before the network apparatus 100 is switched to the temporal management mode). In this embodiment, in addition to the management network address, the first network setting may further comprise, but not limited to, net mask setting, network gateway setting, dynamic host configuration protocol (DHCP) setting, etc.

In one embodiment, in addition to the management network address, the user may also forget the administrator account password. In this situation, even though the user can allow the setting device 200 to connect to the network apparatus 100 by the preset network address, the user still cannot operate the network apparatus 100. Accordingly, the storage unit 150 may further store a management account password and a temporal account password. The management account password is an administrator account password for user operation; while the temporal account password is preset as the network apparatus 100 is manufactured. Therefore, the temporal account password can be stored in a read-only memory whose data cannot be erased or modified, but embodiments are not limited thereto, the temporal account password can also be stored in a memory whose data can be erased and modified. In the operation mode, the processing unit 160 verifies if the setting device 200 is logged in by the management account password, and the user can operate the network apparatus 100 when the setting device 200 is logged in by the management account password successfully. While in the temporal management mode, the processing unit 160 verifies if the setting device 200 is logged by the temporal account password. Therefore, based on the first embodiment mentioned above, in the temporal management mode, in addition to means of the preset network address, the user may also use the temporal account password to login the network apparatus 100.

Figure 3:
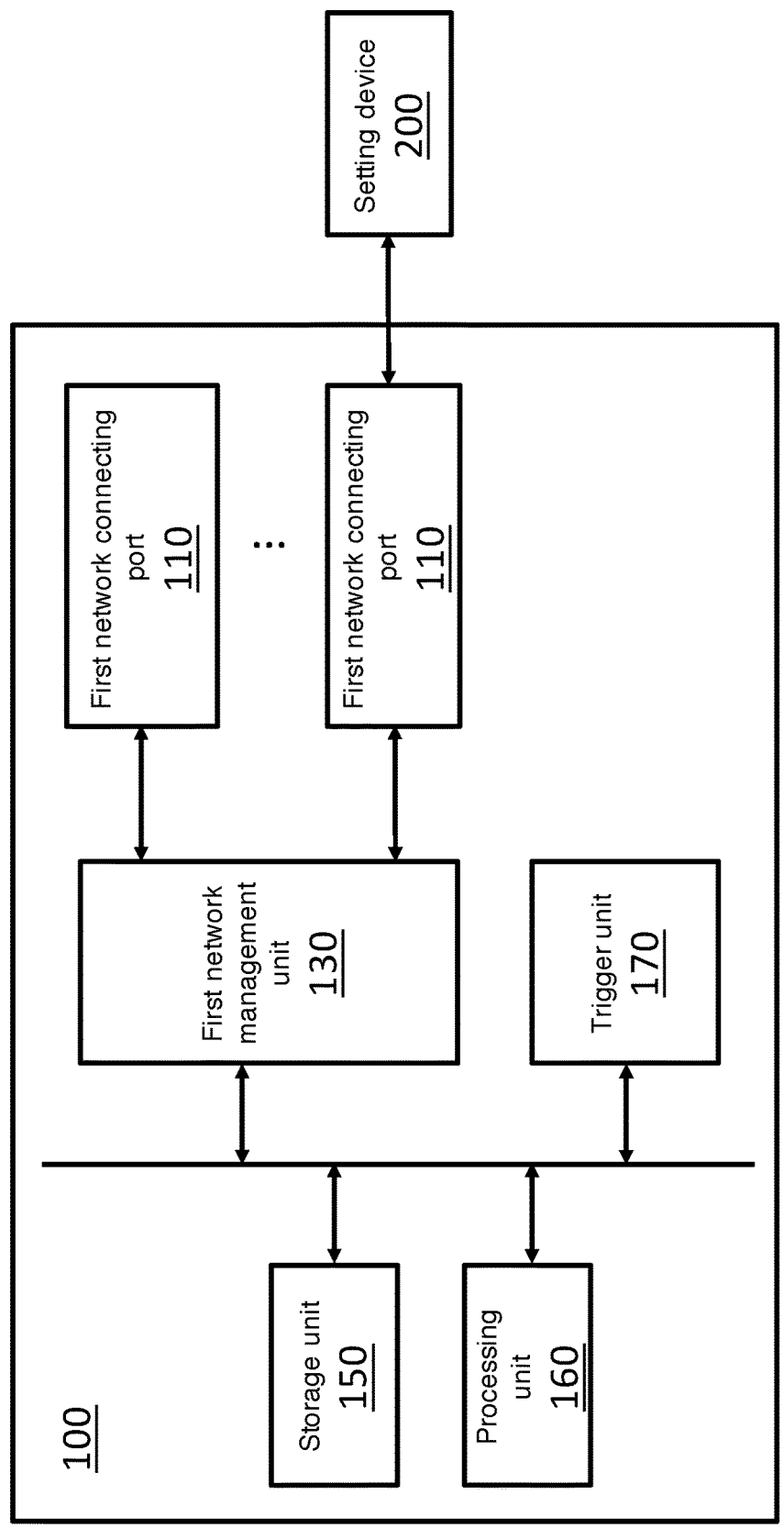
FIG. 3 illustrates a schematic view of a network apparatus for temporarily accessing network setting of a second embodiment of the instant disclosure.

FIG. 3 illustrates a schematic view of a network apparatus for temporarily accessing network setting of a second embodiment of the instant disclosure.

As compared to the first embodiment, in the second embodiment, the network apparatus 100 does not have the second network connecting port 120 and the second network management unit 140. On the other hand, in the second embodiment, the network apparatus 100 comprises a trigger unit 170. Therefore, in this embodiment, the setting device 200 is connected to the first network connecting port 110. In the following paragraphs, the differences between the first embodiment and the second embodiments are described, while the rest features are omitted.

The trigger unit 170 is electrically connected to the processing unit 160, so that the trigger unit 170 generates a trigger signal based on a trigger condition. The trigger condition can be different based on the types of the trigger unit 170. In one embodiment, the trigger unit 170 may have a switch or a button having at least two states, so that the trigger unit 170 generates a trigger signal when the trigger unit 170 is changed from a first state to a second state because of the user's input. For example, when a button of the trigger unit 170 is pressed, the trigger unit 170 generates a trigger signal representing the change in voltage. Alternatively, when a switch of the trigger unit 170 is switched, the trigger unit 170 generates a trigger signal representing open circuit or short circuit conditions. In another embodiment, the trigger unit 170 may be a timer. In other words, after the setting device 200 has been connected to the first network connecting port 110 for a predetermined time, the trigger unit 170 generates a trigger signal representing an overtime condition.

In the operation mode, the processing unit 160 detects if the trigger signal is generated and also detects if a mode switch condition is satisfied. In this embodiment, the mode switch condition is satisfied when the first network connecting port 110 is connected to the setting device 200. When both of the two situation are achieved (i.e., the trigger signal is generated and the mode switch condition is satisfied), the operation mode is switched to the temporal management mode. In the temporal management mode, the processing unit 160 resets the management network address of the first network setting stored in the first network management unit 130 and sets the first network setting to comprise the preset network address, so that the processing unit 160 communicates with the setting device 200. In other words, the first network setting corresponds to the first network connecting port 110 and comprises the preset network address. The processing unit 160 executes a feedback action based on the control command sent by the setting device 200 and detects if the mode switch condition is off (in this embodiment, the mode switch condition is off when the setting device 200 is disconnected with the first network connecting port 110, e.g., the net wire connected between the setting device 200 and the first network connecting port 110 is removed). When the mode switch condition is off, the temporal management mode is switched to back to the operation mode. Accordingly, even when the user forgets the management network address, the user does not have to reset the network apparatus 100 to a default state, and the setting in the network apparatus 100 can be prevented from being reset. After the network apparatus 100 is switched back to the operation mode, the first network connecting port 110 can be provided for connecting to the net surfing device 300 and the network apparatus can execute its original functions.

Based on the above, according to a network apparatus and a method for temporarily accessing network setting of a network apparatus of embodiments of the instant disclosure, when the user forgets the management network address, the user can allow the network apparatus to be switched to the temporal management mode so as to get the management network address again or to change the management network address. In some embodiments, when the user forgets the administrator account password, the user can login the network apparatus by a temporal account password in the temporal management mode. Accordingly, by the switching between the temporal management mode and the operation mode, the network apparatus is not necessary to be reset to a default state, and the setting in the network apparatus can be prevented from being reset.

While the instant disclosure has been described by the aforementioned embodiments, it is to be understood that the invention needs not be limited to the disclosed embodiments. For anyone skilled in the art, various modifications and variations within the spirit of the instant disclosure are covered under the scope of the instant disclosure. The covered scope of the instant disclosure is based on the appended claims.

What is claimed is:

1. A network apparatus for temporarily accessing network setting, comprising:
   a storage unit storing a management network address and a preset network address;
   at least one first network connecting port adapted to connect to at least one external net surfing device;
   a first network management unit electrically connected to the storage unit and the first network connecting port, wherein the first network management unit stores a first network setting, the first network setting corresponds to the first network connecting port and comprises the management network address, wherein the first network management unit communicates with a setting device in an operation mode;
   a second network connecting port being idle normally;
   a second network management unit electrically connected to the storage unit and the second network connecting port; and
   a processing unit electrically connected to the storage unit, the first network connecting port, the second network connecting port, the first network management unit, and the second network management unit, wherein in the operation mode the processing unit detects if a mode switch condition is satisfied, wherein the mode switch condition is satisfied when the setting device is connected to the second network connecting port, wherein when the mode switch condition is satisfied, the operation mode is switched to a temporal management mode, and in the temporal management mode the processing unit controls the second network management unit to store a second network setting, the second network setting comprises the preset network address and corresponds to the second network connecting port, wherein the second network management unit communicates with the setting device, and wherein the processing unit executes a feedback action based on a control command sent by the setting device and detects if the mode switch condition is off, and the processing unit switches the temporal management mode back to the operation mode when the mode switch condition is off, and
   wherein the mode switch condition is satisfied when the setting device is connected to the second network connecting port and when the first network connecting port is disconnected from the net surfing device.

2. The network apparatus for temporarily accessing network setting according to claim 1, wherein the feedback action is sending back a data package comprising the management network address or changing the management network address of the first network setting based on the control command.

3. The network apparatus for temporarily accessing network setting according to claim 1, wherein in the temporal management mode the processing unit resets the first network setting of the first network management unit, and the processing unit sets the first network setting of the first network management unit again based on the management network address after the temporal management mode is switched back to the operation mode.

4. A network apparatus for temporarily accessing network setting, comprising:
   a storage unit storing a management network address and a preset network address;
   at least one first network connecting port adapted to connect to at least one external net surfing device;
   a first network management unit electrically connected to the storage unit and the first network connecting port, wherein the first network management unit stores a first network setting, the first network setting corresponds to the first network connecting port and comprises the management network address, wherein the first network management unit communicates with a setting device in an operation mode;
   a second network connecting port being idle normally;
   a second network management unit electrically connected to the storage unit and the second network connecting port; and
   a processing unit electrically connected to the storage unit, the first network connecting port, the second network connecting port, the first network management unit, and the second network management unit, wherein in the operation mode the processing unit detects if a mode switch condition is satisfied, wherein the mode switch condition is satisfied when the setting device is connected to the second network connecting port, wherein when the mode switch condition is satisfied, the operation mode is switched to a temporal management mode, and in the temporal management mode the processing unit controls the second network management unit to store a second network setting, the second network setting comprises the preset network address and corresponds to the second network connecting port, wherein the second network management unit communicates with the setting device, and wherein the processing unit executes a feedback action based on a control command sent by the setting device and detects if the mode switch condition is off, and the processing unit switches the temporal management mode back to the operation mode when the mode switch condition is off, wherein the storage unit further stores a management account password and a temporal account password, in the operation mode the processing unit verifies if the setting device is logged in by the management account password, and in the temporal management mode the processing unit verifies if the setting device is logged in by the temporal account password.

5. A network apparatus for temporarily accessing network setting, comprising:
   a storage unit storing a management network address and a preset network address;
   at least one first network connecting port adapted to connect to at least one external net surfing device;
   a first network management unit electrically connected to the storage unit and the first network connecting port, wherein the first network management unit stores a first network setting, the first network setting corresponds to the first network connecting port and comprises the management network address, wherein the first network management unit communicates with a setting device in an operation mode;
   a trigger unit generating a trigger signal based on a trigger condition; and a processing unit electrically connected to the storage unit, the first network connecting port, the first network management unit, and the trigger unit, wherein the processing unit detects if the trigger signal is generated and if a mode switch condition is satisfied, if yes, the operation mode is switched to a temporal management mode, wherein the mode switch condition is satisfied when the first network connecting port is connected to the setting device, wherein in the temporal management mode, the processing unit resets the management network address of the first network setting stored in the first network management unit and sets the first network setting to comprise the preset network address, wherein the processing unit communicates with the setting device, and wherein the processing unit executes a feedback action based on a control command sent by the setting device and detects if the mode switch condition is off, and when the mode switch condition is off, the processing unit switches the temporal management mode back to the operation mode, wherein the mode switch condition is satisfied when the setting device is connected to the second network connecting port and when the first network connecting port is disconnected from the net surfing device.

6. The network apparatus for temporarily accessing network setting according to claim 5, wherein the feedback action is sending back a data package comprising the management network address or changing the management network address of the first network setting based on the control command.

7. The network apparatus for temporarily accessing network setting according to claim 5, wherein the storage unit further stores a management account password and a temporal account password, in the operation mode the processing unit verifies if the setting device is logged in by the management account password, and in the temporal management mode the processing unit verifies if the setting device is logged in by the temporal account password.

8. A method for temporarily accessing network setting of a network apparatus, the network apparatus comprising at least one first network connecting port and a second network connecting port, the method comprising:
  storing a first network setting which comprises a management network address and corresponds to the first network connecting port in order to communicate with a setting device through the first network connecting port;
  detecting if a mode switch condition is satisfied, if yes, switching the network apparatus to a temporal management mode, wherein the mode switch condition is satisfied when the second network connecting port is connected to the setting device;
  storing a second network setting which comprises a preset network address and corresponds to the second network connecting port in the temporal management mode in order to communicate with the setting device through the second network connecting port;
  executing a feedback action based on a control command sent by the setting device; and
  switching back to an operation mode when the mode switch condition is off, wherein the first network connecting port is adapted to connect to an external net surfing device in the operation mode,
  wherein the mode switch condition is satisfied when the setting device is connected to the second network connecting port and when the first network connecting port is disconnected from the net surfing device.

9. The method for temporarily accessing network setting of a network apparatus according to claim 8, wherein the feedback action is sending back a data package comprising the management network address or changing the management network address of the first network setting based on the control command.

10. The method for temporarily accessing network setting of a network apparatus according to claim 8, further comprising:
  resetting the first network setting of the first network management unit in the temporal management mode; and
  setting the first network setting of the first network management unit again based on the management network address after the temporal management mode is switched back to the operation mode.

11. The method for temporarily accessing network setting of a network apparatus according to claim 8, further comprising:
  storing a management account password and a temporal account password;
  verifying if the setting device is logged in by the management account password in the operation mode; and
  verifying if the setting device is logged in by the temporal account password in the temporal management mode.

* * * * *